United States Patent [19]

Willard

[11] Patent Number: 4,828,856

[45] Date of Patent: May 9, 1989

[54] METHOD OF MAKING DEHYDRATED HASH BROWN POTATO MIXTURE

[76] Inventor: Miles J. Willard, 229 N. Lloyd Cir., Idaho Falls, Id. 83402

[21] Appl. No.: 159,499

[22] Filed: Feb. 16, 1988

Related U.S. Application Data

[63] Continuation of Ser. No. 864,791, May 19, 1986.

[51] Int. Cl.$^4$ ............................................. A23L 1/216
[52] U.S. Cl. ................................... 426/272; 426/473; 426/506; 426/637
[58] Field of Search ............... 426/637, 272, 473, 506, 426/509

[56] References Cited

U.S. PATENT DOCUMENTS

| | | | |
|---|---|---|---|
| 3,396,039 | 8/1968 | Liepa | 426/637 |
| 4,005,139 | 1/1977 | Kortschot et al. | 426/346 |
| 4,110,478 | 8/1978 | Ooraikul | 426/262 |
| 4,276,314 | 6/1981 | Anderson | 426/272 |

FOREIGN PATENT DOCUMENTS 2445820  4/1975  Fed. Rep. of Germany ...... 426/637

*Primary Examiner*—Donald E. Czaja
*Assistant Examiner*—Celine T. Callahan
*Attorney, Agent, or Firm*—Hopkins, French, Crockett, Springer & Hoopes

[57] ABSTRACT

A dehydrated fabricated potato piece for reconstitution into hash brown potatoes is made for admixture with dehydrated fresh potato pieces. The fabricated potato piece is made from a dough or potato solids (comprising one or more of potato flakes, potato granules or potato flour) with or without mashed potatoes. If mashed potatoes are used, they may be either fresh mashed potatoes or rehydrated dried mashed potatoes. The potato dough is sheeted between a pair of sheeting rolls at a moisture content less than 55%. The sheet of potato dough is then cut into strips and predried to a moisture content of less than 30%. Thereafter, the strips are cut into individual potato pieces, final dried to a moisture of about 7%, and may be mixed with dehydrated fresh potato pieces in a proportion of from 10:90 to 90:10 respectively, and packaged for later rehydration into hash browns.

7 Claims, No Drawings

METHOD OF MAKING DEHYDRATED HASH BROWN POTATO MIXTURE

CROSS-REFERENCE TO RELATED APPLICATIONS

This is a continuation of application Ser. No. 864,791 filed May 19, 1986.

BACKGROUND OF THE INVENTION

Fresh hashbrown potatoes, made from thin (⅛th -¼th inch thick) strips of fresh potatoes provide a nutritious and attractive meal accompaniment, especially for breakfast. While hashbrowns from fresh potatoes undeniably deliver the best potato flavor, in many circumstances it is difficult if not impossible to provide freshly cut potatoes for hashbrowns. For instance, restaurants having limited time available to prepare meals would find it difficult to prepare fresh potatoes for each order of hashbrowns.

Fresh-cut hashbrown potatoes form adequate patties upon frying due to the presence of free starch on the cut potato surface resulting from ruptured potato cells (this free starch acting as "glue" when heated and gelatinized to hold the potato pieces together). Dehydrated fresh potato pieces will not form patties because the cut potato pieces are washed prior to dehydration, thereby removing the free starch. For this reason, dry hashbrown products must provide a "glue" or "binder" in one form or another to make the fresh dehydrated potato pieces adhere to one another in a patty when rehydrated and fried. As described hereinafter, this binder results when fabricated dry potato pieces exhibit adequate sloughing during rehydration.

Therefore, there have been developed, for the institutional or restaurant business, as well as for sale for household preparation dry hashbrown products, such as represented by U.S. Pat. No. 3,634,105, Beck, et al. The product of the '105 Patent is a dehydrated reconstituted potato mixture which, when rehydrated and fried, can be served as hashbrowns or "pan fries". The process of the '105 Patent includes making a slurry of potatoes (either cooked or from dehydrated potato granules or flakes) to which is added a quantity of raw starch. After mixing, the dough at about 75 to 80% moisture is extruded in strips which are steam heated (to gelatinize the raw starch) and then dried at 180°-200° F. for 3-4 hours to reduce the moisture content to approximately 7.5%. The gelatinized raw starch acts as "glue" to hold the individual potato pieces together when they are fried, thereby making a hashbrown patty.

Subsequently, U.S. Pat. No. 3,725,087, Miller et al and U.S. Pat. No. 3,992,222, Beck et al, disclosed methods of making similar dry hashbrown products. The process disclosed in the '087 Patent comprises making a mash of potatoes (from either fresh or dehydrated potatoes), with or without the addition of raw cornstarch, which is heated to a temperature of 160°-179° F. and formed into ribbons. Preferably, the ribbons are pre-dried to lower the moisture content to approximately 65%, with a final drying step to reduce the moisture to less than 8%. This final drying step comprises drying the ribbons at a temperature of from 90°-210° F. and a relative humidity of at least 20% for at least 25% of the final drying time; for the other 75% of the final drying time a relative humidity of at least 10% must be maintained. The '222 Patent discloses a method similar to the '105 Patent, except rather than using dehydrated potato granules, the '222 Patent discloses making the potato slurry from cooked fresh potato.

U.S. Pat. No. 3,410,702, Frank, discloses a dehydrated potato mixture for hashbrowns wherein a first portion of the mixture comprises conventionally dehydrated potatoes cut into hashbrown pieces which have been blanched to inactivate enzymes and washed to remove the free starch on the surface of the potato pieces. A second portion of the mixture utilizes dehydrated potato agglomerates formed by extruding random pieces of cooked potatoes through a round die having a diameter of about ⅛-⅜ inch, such that free starch remains on the surface of the potato agglomerates after dehydration. Optionally, potato starch is added to the mixture to increase the patty-forming attributes, i.e., the stickiness of the dried potatoes. Finally, U.S. Pat. Nos. 3,635,729, Englar et al, and 3,650,776, Tschirgi, both disclose methods for producing dehydrated potato pieces with increased surface stickiness for improved hashbrown patty forming wherein blanched potato pieces are coated with either a starch solution or a potato/whey solution prior to final dehydration.

All of the above noted patents, with the exception of the '702 Patent, disclose a dry hashbrown product comprising only reconstituted potatoes; without any "fresh" potato pieces, much of the flavor is lost through cooking and processing of the potatoes. The process disclosed in the '702 patent suffers chiefly from the fact that the second portion made from cooked potatoes tend to disintegrate during dry storage into small agglomerates which settle to the bottom of the package giving a non-uniform mixture when rehydrated along with the dehydrated potato pieces. In addition, the mashed agglomerates, upon rehydration, return to a "mashed potato" state distinctly different in appearance and texture from the rehydrated potato pieces—highly unappealing to one desiring hash brown potatoes.

There have been two distinct problems associated with the practice of any of the above noted inventions. Firstly, when making hashbrowns as taught by any of these inventions, there is a perceptible lack of fresh potato flavor in the resulting hashbrown products because all of the potatoes have been processed with relatively high heat. As is well known to those skilled in the art, the more processing and the more heat that fresh potatoes endure results in diminished potato flavor. In an attempt to interject more fresh potato flavor into dehydrated hashbrowns, the '702 Patent discloses a process utilizing a portion of fresh potatoes processed only by cooking, mashing through narrow orifices and dehydration. However, while the fresh potato flavor perception may be somewhat greater, as noted above, the second portion of the mixture rehydrates to a mashed potatoes consistency, which, while it may bind the fresh potato pieces into a patty, is certainly not representative of traditional hashbrown potatoes.

Secondly, the products disclosed above do not accurately replicate fresh hashbrown potatoes—they do not "look" or have the "mouthfeel" of fresh hashbrown potatoes. The hashbrown potato pieces of the present invention are formed by sheeting and cutting a stable, non-sticky dough sheet of controlled moisture content making it possible to simulate dehydrated fresh potato pieces in both appearance and mouthfeel when rehydrated and served in a hashbrown patty.

Therefore, there is a distinct need, as yet unfulfilled, for a dehydrated hashbrown potato mixture which delivers the flavor of fresh potatoes, yet has incorporated therein binder materials which cause the fresh dehydrated potato pieces to adhere one to another in a patty, with the binder being provided from formed potato pieces which have an appearance and texture similar to that of the fresh potato pieces.

SUMMARY OF THE INVENTION

Briefly, a potato dough is made from a dry mixture of potato solids comprising one or more of potato flakes, potato granules or potato flour. This dry mixture is hydrated either with water or with mashed potatoes. The mashed potatoes may be either fresh cooked potatoes or rehydrated dried potatoes. This dough is sheeted between sheeting rolls at a moisture content of about 40-55%. It is thereafter cut into strips of appropriate width, as with a pasta cutter, and the strips are predried to a moisture content of about 12 to 30%. They are thereafter cut to length, approximating fresh-cut hashbrown potato pieces, and finish dried to a moisture content of about 7%. These dehydrated fabricated potato pieces are then mixed with dehydrated fresh hash brown potato pieces in a ratio of from 10:90 to 90:10, respectively, and packaged for sale. Upon rehydration and use as hash browns, the fabricated potato pieces slough enough potato solids to cause both the fabricated and the fresh hash brown pieces to adhere into an appealing patty.

DETAILED DESCRIPTION OF THE INVENTION

As noted above, the present invention contemplates a dehydrated formed or fabricated potato shred product which may be rehydrated and formed into patties simulating fresh cut potatoes. While the product of this invention typically sold to consumers will comprise both a first part of dehydrated fresh potato pieces and a second part of dehydrated formed pieces, of similar shape, it is contemplated that an acceptable dry hashbrown potato product can also be provided comprising solely the fabricated (or formed) potato pieces of this invention. However, the preferred embodiment, as set forth below, remains the combination of both parts, resulting in product with enhanced fresh potato flavor.

It is to be understood that while the instant invention contemplates the use of fresh mashed potatoes in the preferred embodiment, the process and products disclosed herein are equally susceptible to the manufacture of a potato dough by replacing the fresh mashed potatoes with reconstituted dry potato ingredients. Therefore, according to the preferred embodiment of the present invention, potatoes of any suitable variety are cooked throughout in order that they may be later formed into fabricated hashbrown potato pieces. It has been found that the most economical manner of cooking the potatoes is to slice or cube the raw potatoes prior to cooking, thereby cooking more uniformly and for a shorter period of time. Typically, the potatoes have been peeled and undesirable imperfections removed prior to cooking. Cooking may advantageously be provided by atmospheric steam which, depending upon the thickness of the potato pieces, may be cooked for about 30 to 40 minutes. These potatoes are then optionally riced through round ½-inch diameter bars with ¼ inch "spacings" there between to substantially disintegrate the cooked pieces uniformly, and are then mixed with dry ingredients which give the product of the present invention its unique character.

The characteristics of the dehydrated potato solids (either in the form of flakes, granules or flour) are chosen so that, at the optimum moisture content of the dough (from about 40% to 50%), the dough will be cohesive enough to maintain its form through sheeting and cutting operations but yet not so adhesive that it sticks to the sheeting rolls and cutting devices. One such combination that has given good result comprises three to four parts potato granules with one part finely ground drum dried potatoes, commonly known as potato flour. Other combinations of dehydrated potatoes such as finely ground diced dehydrated potatoes can be substituted for portions of these ingredients to achieve a particular texture or flavor desired. The selection of the ingredients is easily made by those knowledgeable in the art as described for example in the book *Potato Processing, Third Edition* edited by Talburt and Smith, Chapters 12, 13, 14 and 16.

Because Applicant has found that it is critical that the manufactured hashbrown potato pieces of the present invention be sheeted, rather than extruded, it is important that sufficient dry potato ingredients be added to the mashed potatoes to reduce stickiness and provide a cohesive potato "dough" susceptible to being sheeted. Previously, formed dry hashbrown products as represented by the '105, '087 and '222 patents noted above, have been extruded because it was the only practicable method of forming—the solids content of the dough was low (usually in the 20%-30% range) and the dough was too sticky to be formed by sheeting rolls. The stickiness of these prior potato doughs was also partially due to the inclusion of raw ungelatinized starch, which when subsequently heated produced the stickiness characteristic of gelatinized starches, and necessary as "glue" for subsequently manufactured hashbrown potato pieces. These potato mixtures could not be sheeted because of the high moisture and stickiness of the dough. They were instead extruded onto a dehydration belt for subsequent drying.

The present invention, however, contemplates adding to the mashed potatoes a predetermined quantity of dehydrated potato products which can include potato flakes, granules, potato flour and dehydrated ground potato pieces. The functionality of the ingredients is not to add sources of raw starch which may later be gelatinized but is rather to add potato solids to the mashed potatoes to adjust the moisture content of the resulting mixture so it may be easily sheeted. Upon mixing of the potatoes, a certain portion of the potato cells will be ruptured and the gelatinized starch therein released. However, upon addition of the dehydrated potato products, the adhesive qualities of the released gelatinized potato starch are ameloriated (reduced) somewhat, and the resulting dough is cohesive, rather than adhesive. The resulting dough resembles a stiff bread dough which is not sticky to the touch, but which is easily moldable or formable.

Various other ingredients may be incorporated into the dry mixture which is added to the cooked potatoes, none of which are critical to the present invention. For instance, carboxymethyl cellulose (CMC) may be added as a processing aid for the purpose of making the dough more susceptible to sheeting. Additionally, cellulose ether products which gel upon heating, such as the Methocel$^R$ food gums manufactured by Dow Chemical Company may be added in order to reduce fat or oil pickup during frying. Flavor enhancers in the form of powered onions and monosodium glutamate (MSG) may be added to enhance the flavor of the formed potato pieces.

The mashed potatoes and dry ingredients are thoroughly mixed for a period of time sufficient to produce the non-sticky dough referred to above. The dough is fed into the nip of a pair of conventional sheeting rolls and sheeted to a thickness simulating the thickness of the dehydrated raw potato pieces to which the formed pieces will be added. Generally, this thickness is on the order of 1½ to 2 millimeters. It has been found that the temperature of the dough when sheeted is important to achieve the desired characteristics of the end product. If the dough is warmer than about 140° F., it may stick to the sheeting rolls. In such case it may be advantageous to provide cooled sheeting rolls in order to produce a more uniform sheet of potatoes. It has been found that rolls maintained at a temperature of from about 50° F. to about 100° F. can reduce stickiness of the potato dough.

Control of dough stickiness can also be achieved by increasing the quantity of the non-sticky low absorbent potato solids (such as potato granules), by incorporating small levels of starch complexing agents (such as monoglyceride emulsifiers) into the dough, and by reducing the intensity and duration of the mixing of the dry potatoes with the cooked potato solids.

Dehydrated potato granules represent a dried mashed potato with minimum absorption of water because of the repeated recycling of dry product in the conventional add-back process. (See previous reference *Potato Processing*, Chapter 12.) Finely ground potato flour represents a highly absorptive dehydrated potato product in which the gelatinized starch is immediately available for rehydration and which forms the cohesive bond to achieve the desired dough characteristics. It appears that the characteristics of the dry potato ingredients, especially the granules and flour are important to attain the desired end product. Therefore, identifying the correct ingredients may be critical. Illustrative operative examples of potato granules and flour can be determined by their cold water absorption characteristics. This is most easily measured by a modification of the Bostwick test used in the cereal industry.

Generally, this method consists of making a water slurry of the dried product to be tested, placing a given quantity of the slurry in an open-bottom container on a flat surface, removing the container, and, in a selected period of time, measuring the diameter of the resulting mass. The method, as modified for ingredients used in this process, is as follows:

Place 400 ml of water at 20° C. in a 5 quart KitchenAid mixing bowl. Gradually add 60 gm of dry potato granules or potato flour while stirring with wire whip using a KitchenAid model K 5-A mixer on speed 2, or equipment giving equivalent results. Stop mixer and smooth any lumps that may form. Continue to mix for a total of 1 minute, speed 1. Allow the slurry to stand an additional 2 min. for hydration then stir gently for about 10 sec. Place a 45×45 cm. glass plate over a paper measuring scale and center a 7.25 cm.-diameter (internal), open-bottom, cylindrical container, exactly 7.5 cm. high, over the scale. Transfer the slurry to the container which is resting the vertical position centered on the flat glass plate. Transfer the slurry until the container is filled higher than its top level and strike off the excess with a straight edge. Allow the slurry to rest for 30 sec. then remove the cylinder from the glass plate with a vertical pull, avoiding lateral motion. Allow any remaining contents of the container to drain for 10 sec. After waiting 30 sec. for the size of the patty to reach equilibrium, read its diameter to the nearest millimeter, as shown on the scaled measuring sheet underneath the glass plate.

The results of these tests indicate that a typical acceptable potato granule mixture will spread to a diameter of about 40 cm and a typical potato flour or low leach potato flake mixture usable herein will spread to a diameter of about 11 cm After the dough has been fed into the sheeting rolls and exits at a temperature of from about 80° F. to about 140° F. the dough sheet is directed onto a moving belt which takes the potato sheet into a pair of pasta or macaroni cutters, such that strips of potato dough on the order of 3 millimeters in width are formed. The pasta cutter mechanism may be provided with apparatus such that every other strip of potato dough is directed either to an upper or a lower foraminous belt so that, during pre-drying, there is sufficient space between adjacent strips to prevent adhesion to one another. After pre-drying, the continuous strips of dough are then cut to appropriate lengths, for instance 1.25 inches, replicating conventional hashbrown potato pieces. At this point, the potato dough has the consistency of leather, which enables it to be cut to length without fracturing or sticking. Because the pieces are now basically surface dry, they may be bedded up for a final drying step at a temperature of 100°–120° F., taking the moisture content down to approximately 7%.

In the preferred embodiment of this invention, after this final drying step the formed potato pieces are mixed with dehydrated fresh potato pieces in any desired proportion, such as from 10:90 to 90:10, respectively, and packaged for sale. Alternatively, these formed potato pieces may be packaged by themselves for sale as the dried hash brown product.

It has been found that a critical aspect of the invention is the control of moisture content of the potato dough within the range of 40% to 55% so that the potato dough can be conveniently sheeted rather than extruded. If such potato dough were to be extruded through conventional die openings of the prior art, extremely high extrusion pressures would be necessary, which would likely rupture a significant proportion of the potato cells and create products that would rehydrate to a sticky mass. In contrast, the present invention requires only that the potato dough be compressed through a 1–2 mm opening between opposing rotating sheeting rolls. While the Applicant does not wish to be held to any particular theory, it is believed that the desirable attributes of the products of the present invention may in part be due to the fact that forming can take place with relatively low pressure so that a minimum of additional cell rupture takes place.

Because it appears sloughing is necessary to provide the binding needed to form hashbrown patties, a test was devised to measure the degree of sloughing as a result of rehydration experienced by products of the invention as well as commercially available prior art products. As used herein, the term "sloughing" means the loss of potato solids from the fabricated potato pieces while they are undergoing rehydration in the rehydrating fluid, measured as a percent potato solids recovered in the excess rehydrating water. The test is as follows: fifty (50) gm of dehydrated fabricated hash browns are suspended in 800 ml of water at 150° F. and gently agitated by a magnetic impeller.

After a period of about 60 minutes a sample of the rehydrating liquid is removed without stopping the agitation and the amount of potato solids in the liquid is measured by standard means. It has been found that fabricated products which tend not to adhere together well following rehydration and frying will exhibit relatively little sloughing into the water during this test, giving a concentration of about 0.5% to about 2.0% solids in the liquid. Products which exhibit good patty-forming characteristics will have sloughing levels of of greater than about 2% solids sloughed in the excess rehydrating liquid. Products which lose greater than about 5.0–55% in the sloughing test may be pasty and soft when rehydrated.

It is to be understood that the levels of sloughing of the formed potato pieces noted above are optimal for hash brown patties comprising about a 40:60 ratio of formed: fresh dehydrated potato pieces. If a patty is to be made from solely formed potato pieces, or a higher proportion of formed potato pieces, a somewhat lower slough rate would seem to be desirable.

The relationship between the temperature and the length of time of the pre-drying step is believed critical to form the product of the present invention. If the drying is carried out too quickly, i.e. at too high a temperature, the strips will case-harden and cause internal bubbles. This is undesirable as the finished dry product will float on the surface of the rehydrating liquid, giving a non-uniform result. If the drying rate is too slow or the moisture removal insufficient, the product tends to slough excessively, as described later. While the applicant does not wish to be held to any particular theory, it is believed that selection of the temperature and time of drying and the rate of reduction in moisture content of the formed pieces to from 12% to 30% moisture during this predrying period results in improved cohesion during subsequent rehydration of the sheeted potato pieces.

EXAMPLES

EXAMPLE 1.

A dried fabricated hash brown product was made in the pilot plant as follows:

Idaho Russet potatoes were peeled, trimmed and cut into ½ inch slabs and cooked for 40 minutes in boiling water. Meanwhile a dry mixture was made of potato granules, fine potato flour, onion flour, salt, dextrose and carboxymethyl cellulose (abbreviated hereinafter as CMC).

The cooked potatoes were placed in a 20-quart Hobart bowl and mashed with the paddle on speed 2 for about 10 seconds. 5.72 pounds of the dry ingredients were added to 8.26 pounds of the cooked potatoes while mixing with paddle on speed 1 for 2 minutes. The paddle was then replaced with the dough hook and mixing was continued for another 5 minutes to produce a uniform cohesive dough which was at a temperature of about 120° F. The composition of the dough on a moisture-free solids basis was as follows:

| | |
|---|---|
| Cooked potato solids | 24.8% |
| Potato granules | 54.7% |
| Potato flour | 11.0% |
| Onion powder | 4.5% |
| Salt | 2.0% |
| Dextrose | 2.0% |
| CMC | 1.0% |

The moisture content of the dough was 48.0%.

The dough was sheeted with a single pair of 8" diameter rolls 10" wide, which were maintained warm by circulating water at 100° F. The rollers were adjusted to give a dough thickness of between 1.5 and 1.75 mm. The dough sheet was cut continuously into 3 mm wide strips using a continuous pasta dough cutter. The strips were cut by hand into pieces approximately 1.5 inches long. The cooked strips were partially dried for about one minute by blowing warm air through the bed of strips on a mesh belt to prevent the strips from adhering to each other in subsequent handling.

The samples were placed on the tray of a Proctor and Schwartz model 8078A test drier with air maintained at 240° F. at a velocity of about 400 feet per minute through the bed. The time of drying and moisture content of the pre-dried products are below:

| | Sample 1A | Sample 1B | Sample 1C |
|---|---|---|---|
| Pre-dry time in min. | 5 | 8 | 11 |
| Final moisture content | 27.4% | 23.2% | 17.3% |

The strips were then finished dried to a final moisture content of about 7% in the same drier maintained at a temperature of 120° F.

Rehydration procedure: Samples of the dried strips were rehydrated for 20 minutes in hot tap water at 150° F. They were drained, fried on an oiled 350° F. grill for 5 minutes, turned and fried for 3 minutes more. The results were as follows:

Sample 1A showed 5.4% sloughing and soft texture; and was judged not acceptable.

Sample 1B showed 5.2% sloughing and was slightly better than 1A.

Sample 1C showed 4.0% sloughing and was the best of the series.

In a later test, the use of Methocel, trade name for hydroxypropyl methylcellulose, a cellulose ether food gum manufactured by Dow Chemical Company, produced a firmer texture in the reconstituted shreds when processed as described in this example. When Methocel K4M was used in the dry mix at a level between 1.0% and 4.0% based on total moisture-free solids, the resulting hash browns had a firmer texture when processed as described in this example.

EXAMPLE 2.

A fabricated dry hash brown product was made by a procedure similar to that used in Example 1 except that the cooked mashed potatoes were replaced by reconstituted dried potato flakes. The dried ingredients of this formulation comprised the following on the as-is basis:

Mixture one—

Potato flakes (low leach/low peel), 117.0 gm or 22.0%

Water at 150° F., 468 gm

Mixture one was prepared by adding the hot water to the potato flakes and mixing for 2 minutes in a Hobart 5-quart mixer at speed number 1, giving a "mash" of 18.6% moisture.

| Mixture two | |
|---|---|
| Potato granules | 49.9% |
| Fine potato flour | 14.8% |
| Onion powder | 4.4% |
| Salt | 2.0% |
| Dextrose | 2.0% |
| CMC | 1.0% |
| Methocel K4M | 3.9% |

Mixture two was made by blending the remaining dry ingredients.

After rehydrating the potato flakes, the additional dry solids of mixture two were added and mixing continued with the paddle for 5 minutes until a cohesive uniform dough was obtained.

The dough was sheeted between two 8" diameter stainless rolls to give a sheet approximately 1.75 mm thick. There was no sticking to the rolls nor to the hand operated pasta cutter which was used to divide the sheet into 2 mm wide strips.

The strips were pre-dried at 240° F. for approximately 7 minutes to reduce the moisture content to approximately 20%. The partially dried strips were then cut into pieces approximately 1.25 inches in length and finish dried in an home dehydration apparatus overnight at approximately 100° F. to 120° F.

The dehydrated product of this example was rehydrated for 20 minutes in cold water. This product was fried as-is as a patty on the restaurant grill. While the patties formed by this procedure were somewhat more sticky than those prepared in Example 1, the product was satisfactory in every respect as a binding agent for dehydrated strips made from fresh potatoes.

EXAMPLE 3.

A fabricated hash brown strip was made from a formulation which included no fresh mashed potatoes nor any potato flakes reconstituted to the moisture content of a mashed potato. The following dry ingredients, expressed on an as-is basis, were combined:

| Potato granules | 66.4% |
|---|---|
| Fine potato flour | 19.7% |
| Onion powder | 4.5% |
| Salt | 2.1% |
| Dextrose | 2.1% |
| CMC | 1.4% |
| Methocel K4M | 4.2% |

1000 gm of the blended dry ingredients were mixed together with 468 Ml of hot tap water for 7 minutes on speed 2 with the paddle attachment. Sheeting, cutting and drying were conducted as described in Example 2. This sample was preferred to the product as Example 2 when rehydrated and fried because of a drier texture and less pasty consistency. It was concluded that although the mashed potatoes of Example 1 could be replaced by the dehydrated potatoes of Example 2, it was apparent that the higher concentration of potato granules in Example 3, gave more acceptable product. The lower level of granules in Example 2, combined with the higher level of highly absorbent materials (potato flakes and potato flour) cause a somewhat stickier product.

EXAMPLE 4.

A continuous pilot plant line for producing the fabricated hash brown of this invention was installed and operated to investigate process variables and to produce test quantities of product for consumer evaluation.

Part I of this example describes the production of the fabricated hash brown strips.

Part II describes the production of a conventional dehydrated julienne strips suitable for use when combined with the product of the present invention upon rehydration as a hash brown product.

Part III of this example describes the tests made with the products of sections I and II of this example.

PART I PREPARATION OF FABRICATED HASH BROWN STRIP

A. Ingredients

1. Cooked potatoes

Process grade Idaho Russet potatoes were peeled by standard means and trimmed to remove undesirable portions such as bruised areas. The trimmed potatoes were subdivided for convenience in cooking by cutting into slabs about ⅜" thick. Alternately, thinner slices, such as traditional ⅛" slices used for dehydration, were used in the process.

The sliced potatoes were placed in stainless steel trays and cooked at atmospheric pressure in steam for a period of from 20 to 45 minutes, at which point they were softened throughout. Small potato segments were cooked for a proportionally less time to avoid overcooking.

2. Dry ingredients

A master blend was made of the following ingredients, expressed as percentage on an as-is basis:

| Potato granules | 64.0% |
|---|---|
| Fine potato flour | 19.0% |
| Dry onion powder | 5.7% |
| Methocel K4M | 5.0% |
| Salt | 2.5% |
| Dextrose | 2.5% |
| Carboxy methyl cellulose (CMC) | 1.3% |

B. Dough preparation

To 22.7 pounds of the dry mix was added 32 pounds of cooked potatoes in a 60-quart Hobart mixer, model L-800 using the paddle. The ingredients were mixed on speed 2 for about 2 minutes, after which, the mashed potatoes being thoroughly broken down and distributed into the dry mix, the paddle was removed and the dough hook installed. The dough was kneaded for an additional 5 minutes at speed 2 to give a uniform consistency to the dough and uniform distribution of the dry ingredients without subjecting the dough to additional undesired shear, which would cause stickiness in subsequent operations.

The dough comprised the following ingredients expressed as the percentage of moisture-free solids:

| | Weight as-is | Solids | % on moisture free solid basis |
|---|---|---|---|
| Cooked potatoes (at 20% solids) | 38 lb | 5.6 | 23.1 |
| Granules | 12.74 lb | 11.8 | 48.6 |
| Potato flour | 3.78 lb | 3.5 | 14.4 |
| Onion powder | 1.13 | 1.07 | 4.4 |
| Salt | 0.52 | 0.52 | 2.1 |

|  | Weight as-is | Solids | % on moisture free solid basis |
| --- | --- | --- | --- |
| Dextrose | 0.52 | 0.52 | 2.1 |
| CMC | 0.26 | 0.26 | 1.1 |
| Methocel K4M | 1.01 | 1.01 | 4.2 |

C. Dough forming

1. Sheeting. The dough, at a temperature of from about 100° F. to 130° F., was removed from the mixer and subdivided into convenient portions for a single-stage sheeting operation between two 12" diameter by 18" long stainless steel rollers operated at 0.67 rpm and at a distance between the rolls adjusted to give a dough sheet from about 1.5 mm to about 2.5 mm in thickness. The dough moisture content at this point was from about 44% to about 50% by weight.

2. Surface drying. The dough sheet was conveyed at about 26 seconds/foot from beneath the rollers to a woven wire mesh belt equipped with a supply of warm air over and under the belt to equalize the moisture content on each side of the sheet. For normal operations, a temperature of about 90° F. to 120° F. was sufficient to ensure that the surface of the top and bottom of the dough sheet were similar in dryness and absence of stickiness for the slitting operation which followed. A period of from 2 minutes to 5 minutes residence time on the perforated belt was found adequate to give excellent dough conditioning. During operation of the conditioning process, more or less air could be directed at the top or bottom of the sheet to achieve uniform surface dryness and good separation of the dough strands from the cutter which followed.

D. Slitting

The dough sheet was fed to a pair of conventional macaroni slitting rolls, with exterior diameter of 2.5", operated at peripheral speed equivalent to the velocity of the dough sheet to give a smoothly cut number of strips 3 mm in wide.

After slitting, alternate strands were directed to separate receiving belts situated below the slitter at an angle such that the strands would not become entangled.

E. Drying

1. Pre-drier

Preliminary tests had shown that the dough strands could be cut to length most conveniently if a pre drying step was first performed to reduce the moisture content from about 44–50% to about 12% to 30%. A continuous pre-drier was installed in which the strands were conducted through a single 25' section on 2 belts situated one over the other, each receiving a stream of air heated to a temperature from 300° to 400° F. and in which the strands remained for a period of about 10 to 15 minutes depending upon the stickiness of the dough, the drying conditions and the rate of throughput.

2. Cutting and intermediate drying

Following the reduction to about 12% to 30% moisture content, the strands were cut by a transverse star-shaped cutter with 10 knives impinging upon a hard rubber roller 10" in diameter. After reducing the partially dried strands to an average length of about 1.25 to about 1.75 inches, they fell into a vibratory conveyor 3 feet wide by 7 feet long, fitted with a perforated plenum into which air was introduced at a temperature of about 90° F. to 120° F. Following a residence time in this drier from 15 to 40 minutes, the moisture content of the fabricated hash browns had been reduced to about 12% to 20% moisture, at which point they were stable in shape and could be piled at deeper levels without adhering to each other.

3. Final drying

Final drying to a moisture content of about 7% was accomplished in a bin 4'×4'×4' fitted with a perforated stainless steel bottom into which air was introduced at about 90° F. at low velocity. A period of from 1 to 12 hours in this bin assured slow moisture removal to the final moisture content to avoid fracturing or checking which is known to occur in starch-based products (such as macaroni) if final drying rates are too rapid. The final moisture content was about 5% to 8%. For continuous operation at higher rates of production the drying steps would be carried out most conveniently in a multi-tiered conventional macaroni drier, the design of which is well known in the art.

PART II—PRODUCTION OF JULIENNE STRIPS.

The process used for making these products is well known to the art and forms no part of this invention. It is included here as a matter of convenience in describing the ultimate use of the Part I product in blends with conventionally-produced potato strips.

A. Potato preparation

Idaho Russet potatoes are peeled, trimmed and cut into elongated thin strips using a model CC Urschel slicer manufactured by the Urschel Manufacturing Company, Valparaiso, Indiana. One typical strip size is the 1/16 inch strip which resembles the piece size of the fabricated hash brown strip made in Part I above. Other size dehydrated pieces such as $\frac{3}{8}"\times\frac{3}{8}"\times 1/16$ inch pieces can be used in both processes. B. Blanching and dehydration The strips are washed in cold water to remove surface starch, blanched, drained, sprayed with solution of 17,000 ppm sodium bisulfite and deposited in a layer approximately 4" thick on the first stage of a conventional Procter & Swartz conveyer drier. Drying is accomplished by conventional means to a moisture content of 7%. Following this, the product is blended with the fabricated hash brown of this invention as described below.

PART III—Utilization of the product of this invention.

A. Conventional rehydration

A mixture of 40 parts fabricated hash browns (Part I) and 60 parts conventional hash browns (Part II) is made in a dry blending operation. For normal distribution, the product is packaged in water tight "milk-carton" type packages manufactured and licensed by EX-cell-o Corporation. For optimum rehydration, 1 gallon cold water is added to 2 pounds of blended mixture in the carton and allowed to stand overnight. The following morning, any excess water is drained off and the hash browns are then fried in single or multiple portions on a heated fat-coated grill. Hash brown patties made by this embodiment of the invention have sufficient adhesive power to hold together in a defined patty shape but are not sticky or objectionably cohesive.

The flavor of the fabricated hash brown product of this invention enhances the eating quality of the freshly prepared fried julienne strips, as it provides the fresh potato flavor of the fresh mashed potato used in the formulation. The fabricated hash brown product also provides additional reducing sugar to achieve adequate browning and optional flavorings such as onion powder and MSG. The binding power of the reconstituted fabricated hash brown holds the dried non-adhesive julienne strips in the patty shape desirable for consumption as conventional hash browns.

B. Quick-serve rehydration

Hot water at 120° F. to 130° F. is added to the same 60:40 mixture of fresh dehydrated strips and fabricated strips described above. To avoid excess rehydration of the fabricated strips, this procedure is terminated after 20 minutes residence time, at which point the results are substantially the same as described above. Longer periods of hydration can cause a more sticky or watery consistency, which, although objectionable to some, will still not detract from the overall quality of the hash brown patty to most consumers.

C. Use of fabricated hash browns alone

In certain cases, the fabricated hash brown of the invention can be used alone as a hash brown patty ingredient. For this the following formulation and processing conditions must be met:

1. Cooking of the parent potatoes pieces must be at a minimum.
2. Reconstitution must be in water at a maximum temperature from 35° F. to 80° F.
3. The level of potato solids derived from the dehydrated potato granules in the mixture, expressed as a percentage of the total potatoes in the final product, must be increased from the normal of 48% to at least 60%. This can be achieved by either reducing the quantity of highly absorbent dried potato ingredients in the dry mix or by using less cooked mashed potato solids.
4. Other alternatives to provide a fabricated hash brown potato which can be used at a 100% level for reconstitution include the following:
    4. Subjecting the cooked potatoes used for mixing with the dry ingredients to a precooking/cooling step described in U.S. Pat. Nos. 2,787,553 and 3,012,897 to Willard, Cording and Sullivan.
    4.2 Another alternative involves adding known emulsifiers such a monoglyceride compounds, such as Myverol 1806, to the fabricated hash brown formulation. The doughs produced from such mixtures are less cohesive and will require use of heated sheeting cools, i.e. at temperatures of from 90° F. to 140° F., for production of a suitable dough sheet for forming, slitting and drying.

I claim:

1. A method for producing a dehydrated hash brown potato mixture which when rehydrated and fried simulates freshly cut hash brown potatoes, said method comprising:
    a. slicing, blanching and dehydrating a first portion of freshly cut hash brown potato pieces;
    b. preparing a second portion of dehydrated formed hash brown potato pieces by;
        1. adding dehydrated potato granules to a quantity of mashed potatoes,
        2. adding potato flour to said dehydrated potato granules and mashed potatoes,
        3. sheeting and cutting said second portion into individual potato pieces, and
        4. dehydrating said potato pieces to a moisture content of about 7%,
    c. mixing said first and second portions in a ratio of from 70:30 to 40:60 respectively.

2. The method according to claim 1, including providing the mashed potatoes in the form of either fresh cooked potatoes or hydrated potato solids.

3. The method according to claim 2, including providing the first and second portions in a ratio of 60:40 respectively.

4. The method according to claim 1, including predrying the individual potato pieces to a moisture content of from 12-20% prior to dehydration.

5. A method of ensuring adhesion of dehydrated fresh hash brown potato pieces when rehydrated in water and fried, comprising mixing a quantity of dehydrated formed hash brown potato pieces to a quantity of dehydrated fresh hash brown potato pieces, said dehydrated formed hash brown potato pieces sloughing an effective quantity of potato solids therefrom during rehydration with said dehydrated fresh hash brown potato pieces, such that potato solids sloughed from the dehydrated formed hash brown potato pieces cause the dehydrated fresh hash brown potato pieces and the dehydrated formed hash brown potato pieces to adhere to one another when fried.

6. The method of claim 6, further comprising mixing the dehydrated fresh hash brown potato pieces with the dehydrated formed hash brown potato pieces in a ratio of from about 70:30 to about 40:60, respectively 7. A method for producing a dehydrated hash brown potato mixture which when rehydrated and fried simulates freshly cut hash brown potatoes, said method comprising:
    a. slicing, blanching and dehydrating a first portion of freshly cut hash brown potato pieces;
    b. preparing a second portion of dehydrated formed hash brown potato pieces by the following steps:
        1. making a potato dough having less than about 50% moisture from a first quantity of fresh mashed potatoes and a second quantity of dehydrated potato solids,
        2. sheeting the potato dough to a thickness of from about 1-2 mm,
        3. cutting the potato dough into individual formed hash brown potato pieces,
        4. dehydrating the individual formed hash brown potato pieces by predrying the pieces at a first temperature to about 12-30% moisture, and thereafter finish drying the pieces at a relatively lower second temperature to a moisture content of about 7%;
    c. said second dehydrated portion exhibiting a sloughing loss of a 50 gm sample after 60 minutes rehydration in 800 ml of 100° F. water results in at least 2.0% potato solids sloughed into the water; and
    d. mixing the first and second portions in a ratio of from about 40:60 to about 70:30 respectively.

* * * * *